(12) United States Patent
Vindler et al.

(10) Patent No.: US 11,929,642 B2
(45) Date of Patent: Mar. 12, 2024

(54) RAPID SET DONUT WEDGE

(71) Applicant: Siemens Energy, Inc., Orlando, FL (US)

(72) Inventors: Michael R. Vindler, Pittsburgh, PA (US); Michael A. Hall, Greensburg, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 344 days.

(21) Appl. No.: 17/433,661

(22) PCT Filed: May 3, 2019

(86) PCT No.: PCT/US2019/030538
§ 371 (c)(1),
(2) Date: Aug. 25, 2021

(87) PCT Pub. No.: WO2020/226604
PCT Pub. Date: Nov. 12, 2020

(65) Prior Publication Data
US 2022/0103025 A1   Mar. 31, 2022

(51) Int. Cl.
*H02K 1/16* (2006.01)
*H02K 1/18* (2006.01)
*H02K 15/02* (2006.01)

(52) U.S. Cl.
CPC .......... *H02K 1/185* (2013.01); *H02K 15/024* (2013.01); *H02K 1/16* (2013.01)

(58) Field of Classification Search
CPC .................................. H02K 1/185; H02K 1/16
See application file for complete search history.

(56) References Cited

U.S. PATENT DOCUMENTS

| | | | |
|---|---|---|---|
| 5,875,540 A | 3/1999 | Sargeant et al. | |
| 7,202,587 B2* | 4/2007 | Sargeant | H02K 15/028 310/418 |
| 9,300,172 B2 | 3/2016 | Dhekane | |
| 2015/0236553 A1 | 8/2015 | Pabst | |

FOREIGN PATENT DOCUMENTS

EP   1592107 A2   11/2005

OTHER PUBLICATIONS

PCT International Search Report and Written Opinion of International Searching Authority dated Jan. 21, 2020 corresponding to PCT International Application No. PCT/US2019/030538 filed May 3, 2019.

* cited by examiner

*Primary Examiner* — Dang D Le

(57) ABSTRACT

A generator including a stator frame, a plurality of stator donuts including a plurality of circumferentially disposed notches, and a plurality of a wedge assemblies for mounting the stator donuts to a plurality of building bolts is presented. Each wedge assembly includes a set of opposing wedges. The set of opposing wedges are positioned within a notch in a stator donut to create a locking force between a building bolt and the stator core. The wedge assembly also includes a tensioning bolt to set the opposing wedges to a position creating the locking force between the stator core and the building bolt.

13 Claims, 5 Drawing Sheets

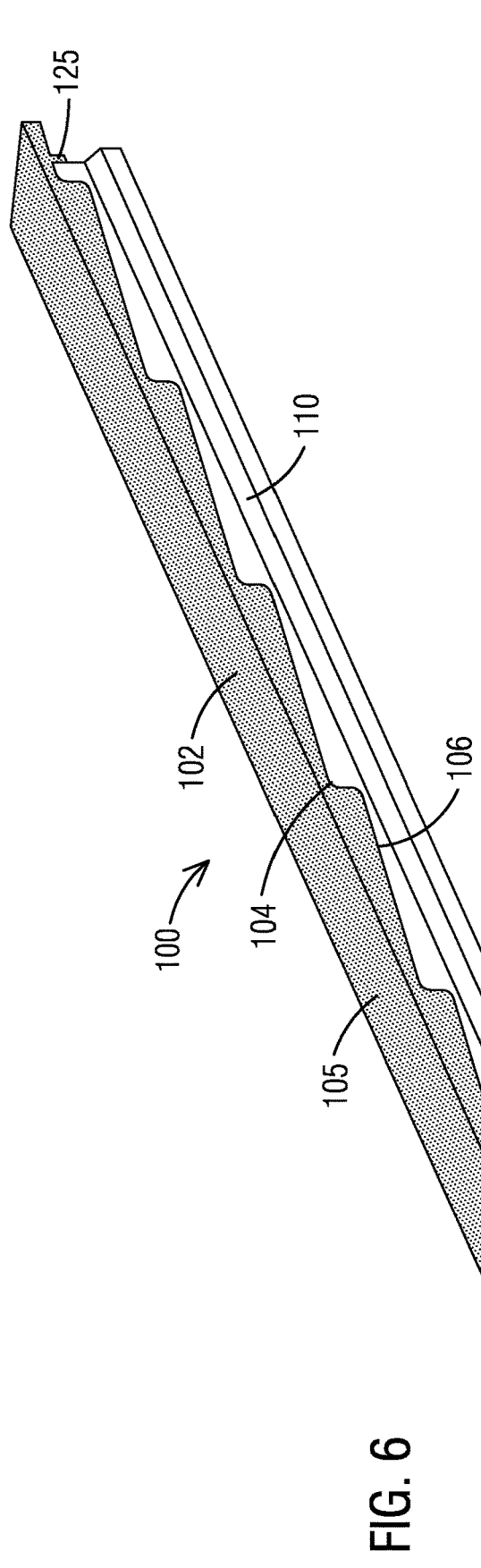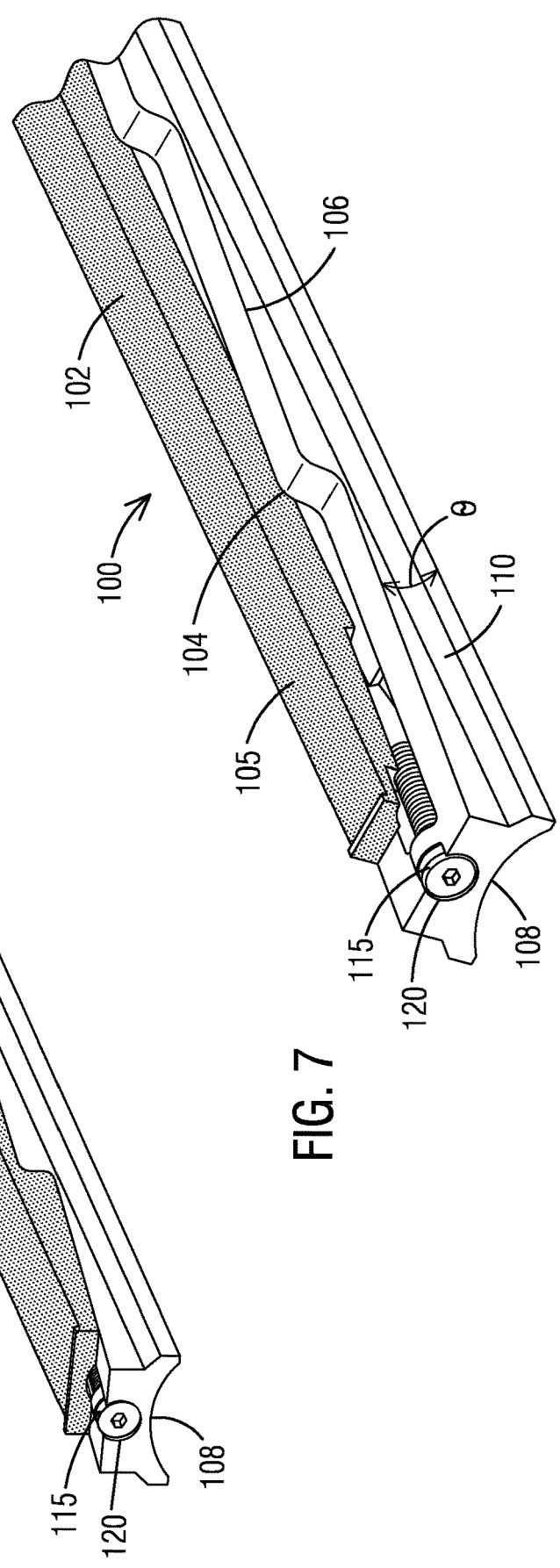

RAPID SET DONUT WEDGE

BACKGROUND

1. Field

The present disclosure relates generally to electric power generators, and more particularly, to a wedge assembly for securing a stator core of a generator to a building bolt associated with a stator frame during a stator core stacking process.

2. Description of the Related Art

A stator core for a high voltage generator is typically a stacked assembly of several thousand laminations of a relatively thin ferrous material, such as iron or steel. Each lamination is formed by configuring a plurality of pie-shaped plate sections, such as nine sections, to form a laminate plate ring, where each section is stamped from a piece of the ferrous material. A number of these laminate plate rings are then stacked on top of each other within a fixture where they are compressed together. The compressed stack of laminate plate rings are placed in a vacuum chamber where a resin is used to secure the rings together and where the resin is cured in a heated oven. The resulting stack of plate rings forms a single unit often referred to as a stator pack or stator donut. U.S. Pat. No. 5,875,540, the entire disclosure of which is incorporated by reference herein, discloses a stator core assembly process in which the donuts are stacked to form the stator core. The stator core may be attached to a stator frame utilizing wedge sets, as a stator core to frame attachment mechanism, to secure a group of donuts to building bolts associated with the stator frame.

In one stator core assembly operation, the stator packs are slid onto the building bolts and supported by a series of notches circumferentially disposed around the stator packs, where a plurality of stator packs, such as four or five stator packs, are secured to the building bolts using opposing wedge sets on each side of the building bolt. Each wedge set includes a filler piece that lies directly against the building bolt, a static wedge that lies against the donut core sections, and a driven wedge that opposes the static wedge and is driven between the filler piece and the static wedge to securely hold the stator pack to the building bolts. Currently, this process involves fitting the driven wedge until it is 'snug' then marking the wedge a distance back from that marked line. The driven wedge is then cut and driven with mallets or hammers until it is flush with the static wedge and filler piece. Test data has shown that the push out forces on the wedges vary widely from almost loose to overly tight and nearly impossible to drive flush. The overly tight wedges pose a big safety hazard to the technicians driving the wedges as larger and larger sledge hammers are used to try to drive the wedges flush. Consequently, a stator core arrangement that is easier and faster to install is desired.

SUMMARY

Briefly described, aspects of the present invention relate to a generator, a method of assembling a stator core of a generator, and a wedge assembly for securing a stator core of a generator to a building bolt during a stator core stacking process A first aspect provides a generator. The generator includes a stator frame, a plurality of stator donuts defining a stator core, and a plurality of wedge assemblies. The stator frame includes a bore and a plurality of circumferentially disposed building bolts mounted around and extending within the bore. Each stator donut includes a plurality of circumferentially disposed notches around an outer perimeter of the donut that align with notches in other stator donuts and form slots extending the length of the stator core. Each notch includes opposing side walls, each side wall includes a groove. The plurality of wedge assemblies are utilized for mounting the stator donuts to the plurality of building bolts. Each wedge assembly includes a set of opposing wedges, the set positioned within a respective notch to create a locking force between a building bolt and the stator core and a tensioning bolt. The tensioning bolt sets the opposing wedges to create a locking force between the stator core and the building bolt.

A second aspect provides a method of assembling a stator core of a generator, the generator as described above. The method includes the steps of stacking a plurality of stator donuts to define a stator core and attaching the stator core to a stator frame of a generator by mounting the stator donuts to respective building bolts utilizing a plurality of wedge sets. The mounting includes sliding each wedge assembly into a respective notch so that a first side of the upper wedge is positioned to abut a wall of the groove and a curved side of the lower wedge lies against the building bolt. The tensioning bolt of each wedge assembly is tightened effective to secure the stator core to the building bolt.

A third aspect of provides a wedge assembly for securing a stator core of a generator to a building bolt during a stator core stacking process. The wedge assembly includes a set of opposing wedges configured to slide into a notch of a stator core and provide a locking force between the building bolt and the stator core. The set of opposing wedges include an upper wedge and a lower wedge. The upper wedge includes a first surface and a first opposing surface including a threaded portion. The lower wedge includes a curved surface that conforms to the building bolt and a second opposing surface that mates to the first opposing surface. The first opposing surface of the upper wedge and the second opposing surface of the lower wedge include a ramped profile that interlock when mated. The wedge assembly also includes a tensioning bolt that is arranged to receive a torque effective to drive the set of opposing wedges in opposite directions making the wedge assembly thicker.

BRIEF DESCRIPTION OF THE DRAWINGS

FIG. 6 is a perspective view of a wedge assembly according to an embodiment of the invention, FIG. 7 is a zoomed in perspective view of the wedge assembly according to an embodiment of the invention.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
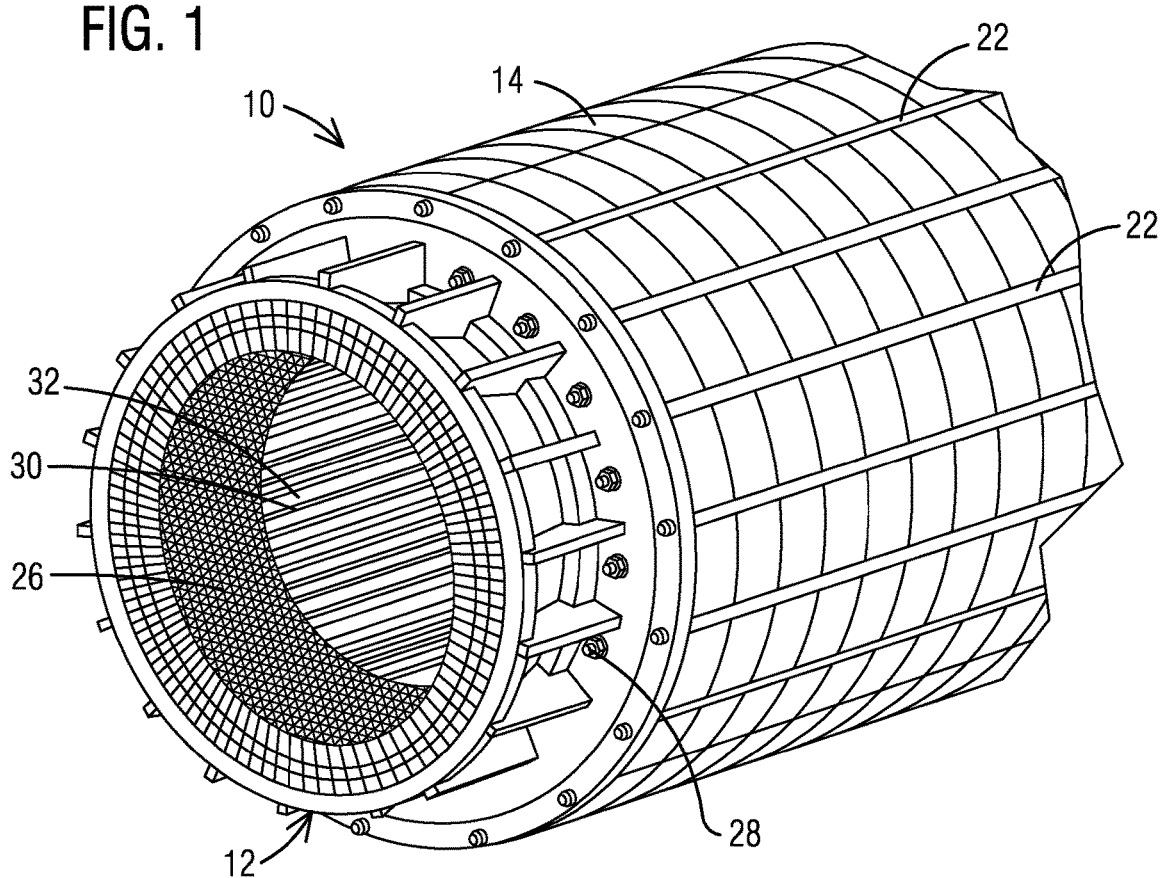
FIG. 1 is a cut-away, perspective view of a stator core for a high voltage generator.

FIG. 1 is a cut-away perspective view of a stator core 10 for a high voltage generator, where the core 10 is shown separated from an inner frame of the generator. The stator core 10 includes a plurality of stacked stator donuts 14. An end unit 12 is mounted to each end of the stack of the stator donuts 14, where the end unit 12 and the stator donuts 14 define an internal bore 26 in which a rotor (not shown) is positioned in a manner well understood by those skilled in the art.

Figure 2:
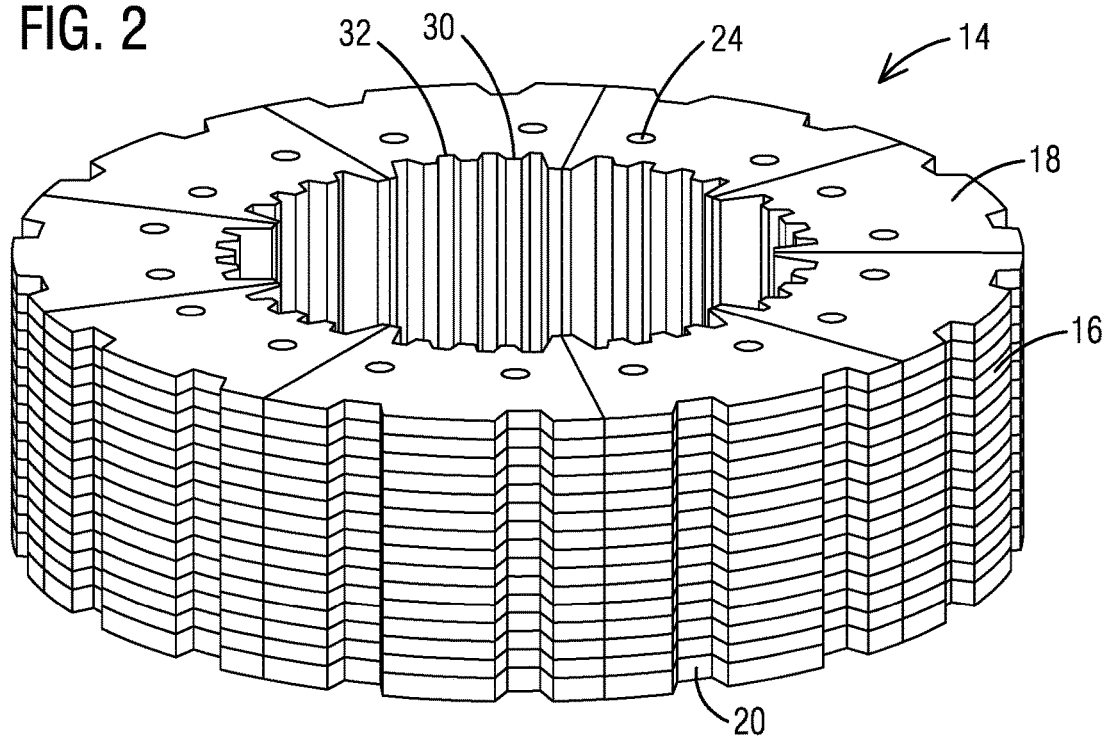
FIG. 2 is an isometric view of a stator donut including a plurality of laminate plates.

A stator core 10 as described above comprises a plurality of stacked stator packs 14, or stator donuts as referred to herein. A stator donut 14, separated from the stator core 10 may be seen in FIG. 2. Each stator donut 14 is an assembly of several laminate plate rings 16 each being formed by a plurality of pie-shaped plate sections 18 to form the donut in the manner, for example, discussed above. Each stator donut 14 includes a series of circumferentially disposed notches 20 that accept building bolts 22 during assembly of the stator core 10. Additionally, each of the stator donuts 14 includes a plurality of bores 24 where the bores for all the stator donuts 14 are to be aligned with each other to accept through bolts 28 that compress and hold the stator donuts 14 together to form the stator core 10. Further, the plate sections 18 that make up the stator donuts 14 are stamped to define a series of stator core teeth 30 defining slots 32 in which stator windings are provided as part of the stator core 10.

Figure 3:
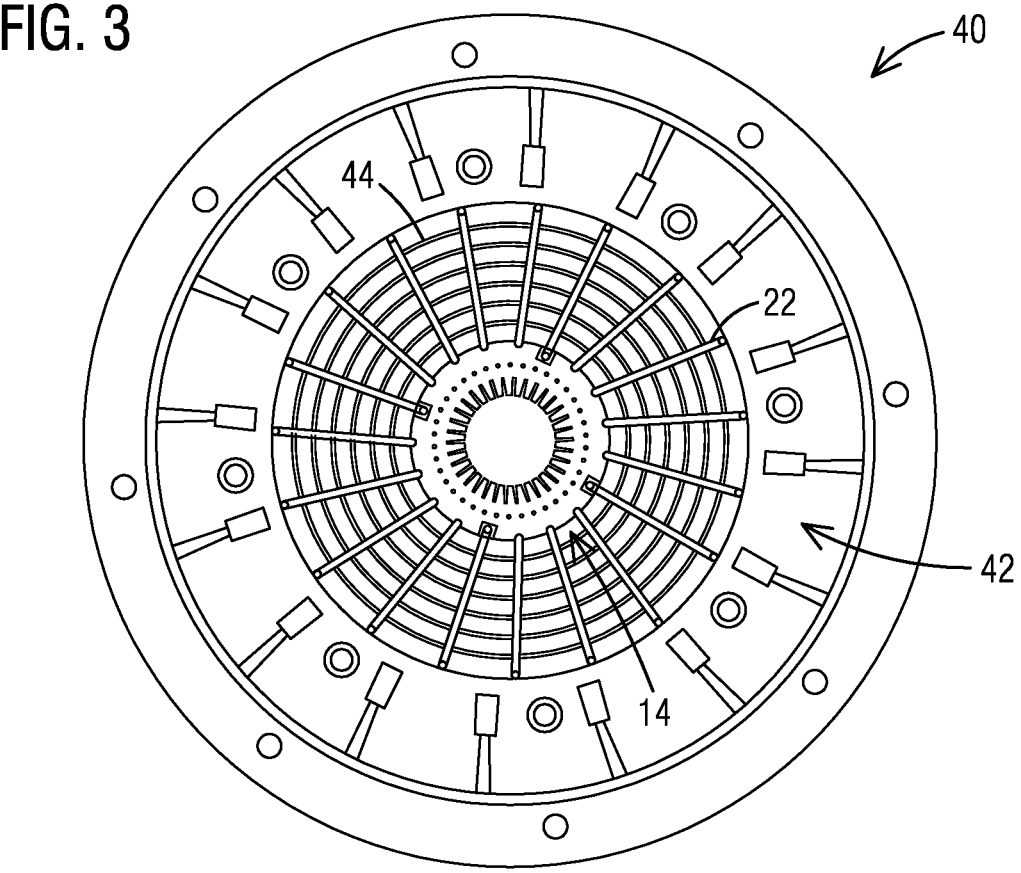
FIG. 3 is a front isometric view showing stator donuts being mounted to a generator frame.

FIG. 3 is a front isometric view of a generator frame 40 including an internal bore 42 showing how the stator core is assembled. The building bolts 22 are positioned around the bore 42 and are mounted to annular ribs 44, where the bolts 22 are positioned within the notches 20 in the stator donuts during the assembly process.

During assembly, workers, using appropriate equipment and machines (not shown), will slide the notches 20 in the donuts 14 onto the building bolts 22 from one end of the bore 42 to the to the end of the bore. Once a predetermined group, for example, four or five, of the stator donuts 14 have been inserted into the bore 42 and are positioned adjacent to each other, a number of wedge sets are used to secure that group of donuts to the building bolts 22 so that each of the groups of the donuts 14 are secured to the bolts 22 with separate wedge sets.

In order to secure generator core donut sections 18 to the building bolts 22 in a safer, faster way, the inventors propose an alternate wedge assembly to replace the conventional wedge set that has been previously utilized. The proposed wedge assembly fits into the existing notches of the stator donuts and may be tightened utilizing a standard pre-calibrated torque tool. Broadly, a generator including a plurality of wedge assemblies for mounting the stator donuts to the plurality of building bolts is described.

Figure 5:
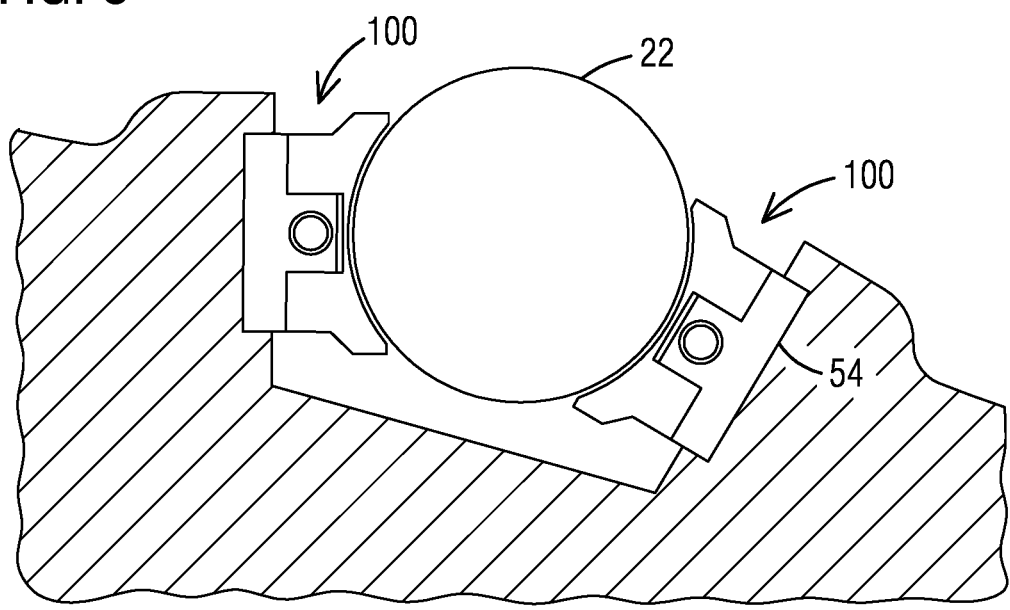
FIG. 5 is a cut away front view of a portion of a stator core showing an opposing wedge set pair positioned within a notch for securing the stator donut to a building bolt according to an embodiment of the invention.
Figure 4:
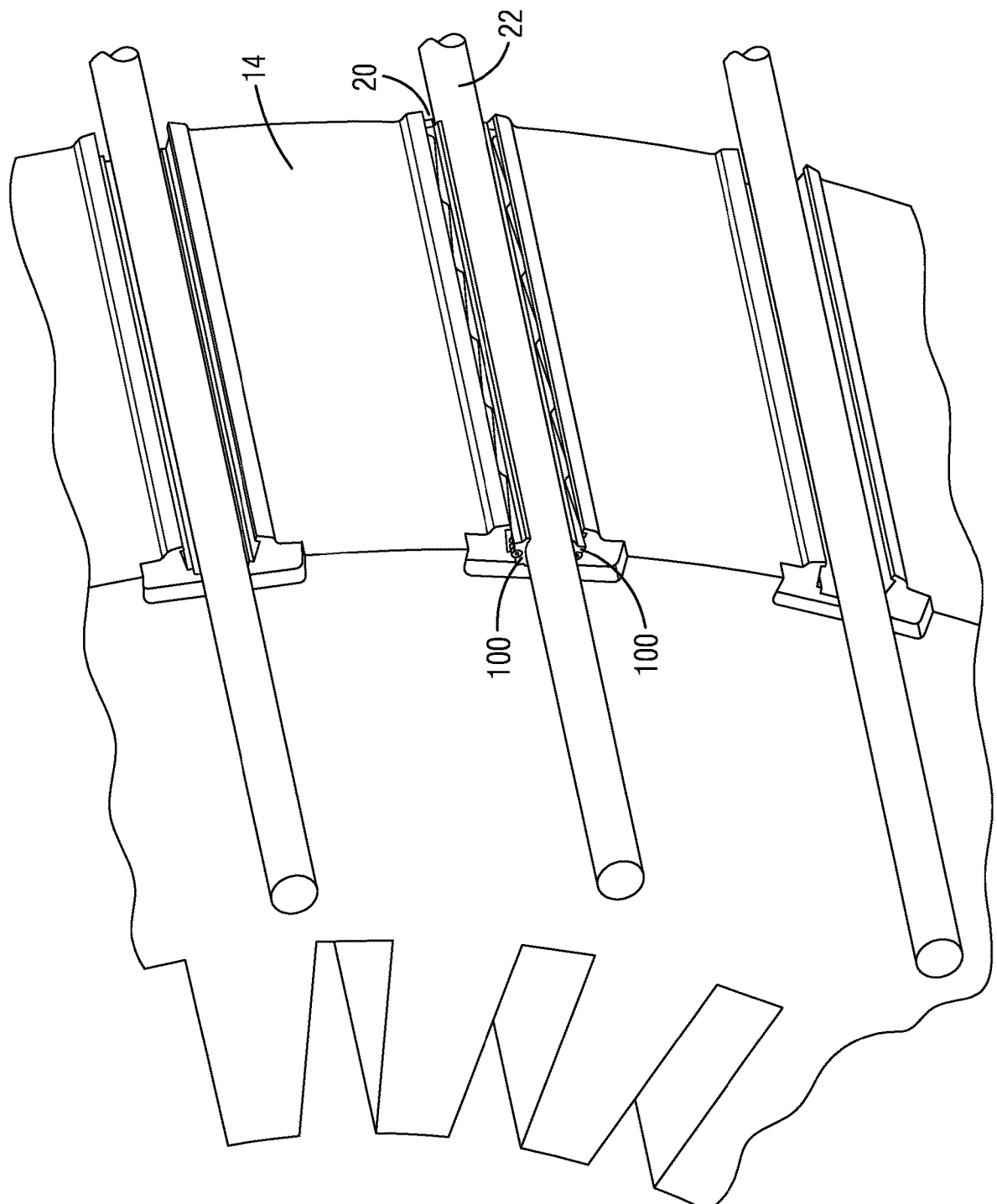
FIG. 4 is a perspective view of a portion of generator stator core with wedge assemblies according to an embodiment of the invention.

FIG. 4 illustrates a perspective view of a portion of a stator donut 14 secured to the building bolts 22 by a plurality of wedge assemblies 100 according to an embodiment. A wedge assembly 100 is provided within each notch 20 to secure the building bolt 22 to the stator core 10. Each wedge assembly 100 may be placed within a respective notch 20 so that a surface of the wedge assembly 100 engages with a groove 54 on a side wall of the notch as shown in FIG. 5. For example, as illustrated in FIG. 5, a pair of wedge assemblies 100 are provided and arranged on opposite sides of the respective building bolt 22.

Referring now to FIG. 6, a perspective view of a wedge assembly 100 according to an embodiment is illustrated. Each wedge assembly 100 may include a set of opposing wedges. The set of opposing wedges may include an upper wedge 105 and a lower wedge 110. The opposing wedge set 100 may be utilized to create a locking force between the building bolt 22 and the stator core 10. In order to set the wedge assembly 100 to a position such that a sufficient locking force is created, a tensioning bolt 115 arranged to receive a tensioning force by a standard tightening tool may be used.

Figure 8:
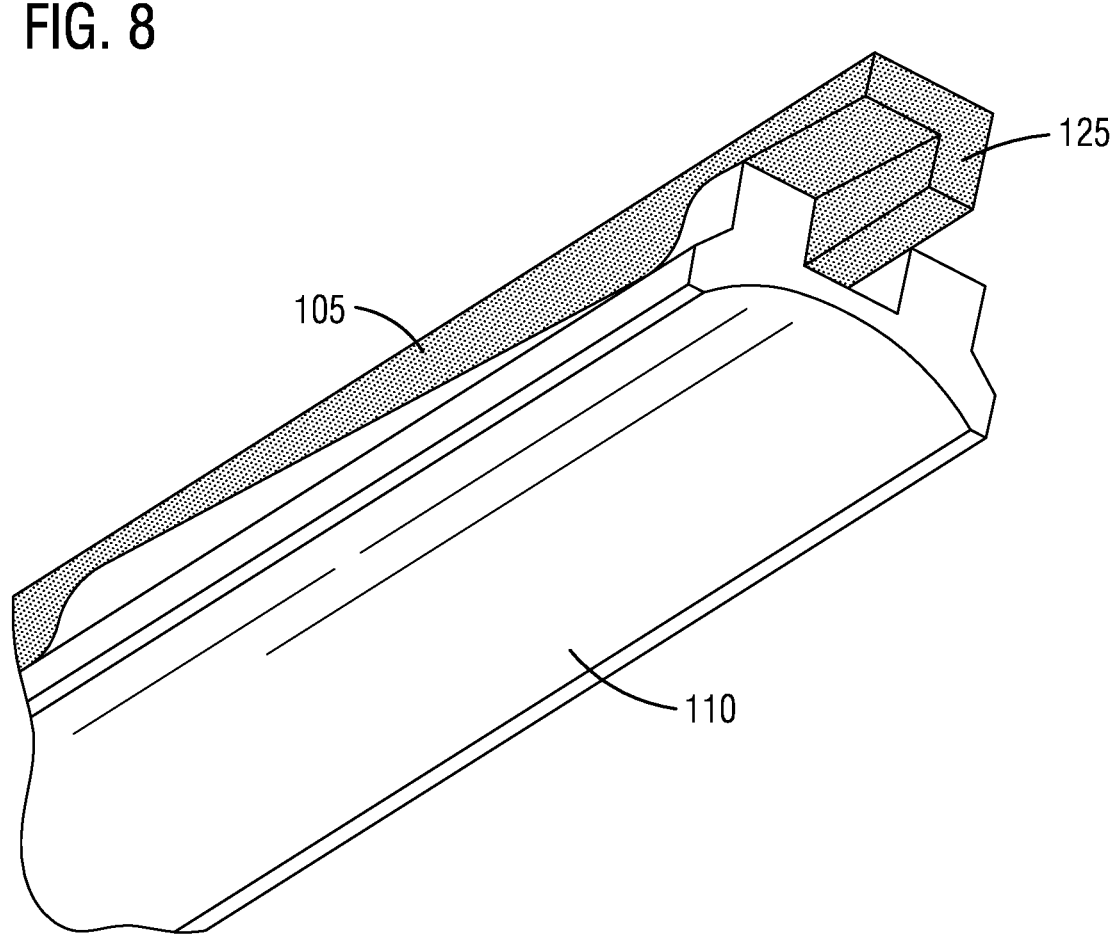
FIG. 8 is a perspective view of the wedge assembly according to an embodiment of the invention.

In an embodiment, the upper wedge 105 includes at least two surfaces, a first surface 102 and a first opposing surface 104. In an embodiment, the first surface includes a flat surface that may engage with the groove 54 on the side wall of the notch 20. The first opposing surface 104 may include a repeating ramped profile. The first opposing surface 104 may include a threaded portion (not shown) configured to receive the tensioning bolt 115. In addition, a portion of the first opposing surface may include a rib 125. The rib maintains alignment of the upper and lower wedge. A lower wedge 110 may include at least two surfaces. A second opposing surface 106 of the lower wedge 110 may have a repeating ramped profile configured to correspond to the contour of the repeating ramped profile of the first opposing surface 104 of the upper wedge 105. The lower wedge 110 and the upper wedge 105 may be placed so that the corresponding ramped profiles of the opposing wedges interlock as shown in FIG. 6. A slot 120 may exist within the second opposing surface 106 of the lower wedge 110 to carry the tensioning bolt 115. The slot may also carry the rib 125 which extends from the first opposing surface as seen in FIG. 8. The lower wedge 110 may also include a second surface 108 having a curved profile that conforms to a building bolt 22. The curved profile may include a concave-shaped surface.

The repeating ramped profile of the opposing wedges (first opposing surface 104 and second opposing surface 106) includes a ramp angle $\theta$. The ramp angle $\theta$ may be seen in FIG. 7 which shows a perspective view of the wedge assembly 100 without the upper and lower wedges 105, 110 interlocking. The ramp angle $\theta$ is shown on the lower wedge 110. The upper wedge 105 would have a corresponding ramp angle in its ramped profile in order to interlock with the lower wedge 110. The ramp angle $\theta$ may lie in a range of greater than 0 to 10 degrees. In an embodiment, the ramp angle $\theta$ may be used to calculate a sufficient force, or locking force as referred to herein, imparted by the wedge assembly 100 to secure the building bolt 22 to the stator core 10. The locking force may be calculated using the ramp angle $\theta$ and the torque applied to the tensioning bolt 115

In the illustrated embodiment of FIG. 7, the lower wedge 110 includes a slot 120 that carries the tensioning bolt 115. In an embodiment, the tensioning bolt 115 is a screw containing threads. The screw may extend parallel to the ramp angle θ so that no binding occurs. When the screw is tightened using a torque, the threads engage with the threaded portion in the upper wedge 105 moving the upper wedge 105 and lower wedge 110 against one another in opposite directions. As the opposing wedges slide against one another, the thickness of the wedge assembly 100 increases creating an increased force on the stator core 10 when the opposing wedges 105, 110 are installed in notches 20 of the stator donut 14. Once a locking force is achieved, the tightening may be stopped. In an embodiment, the torque may be applied using a standard pre-calibrated torque tool such as a ¼ inch ratchet.

In an embodiment, the upper and lower wedges 105, 110 may comprise steel. In an alternate embodiment, the upper and lower wedges 105, 110 may comprise an insulating material that ensures that the generator core is not electrically connected to the building bolts. In a further alternate embodiment, the upper and lower wedges 105, 110 may comprise injection-molded plastic which has insulating properties and is inexpensive.

Referring now to FIGS. 1-7, a method for assembling a stator core 10 of a generator is described. The method includes stacking a plurality of stator donuts 14 to define a stator core 10 as previously defined in U.S. Pat. No. 5,875, 540. Next, the stator core 10 is attached to a stator frame 40 of a generator by mounting the plurality of stator donuts 14 to a plurality of building bolts 22 associated with the stator frame 40 utilizing a plurality of wedge assemblies 100 as previously described. Each wedge assembly 100 may slide into a notch 20 in the stator core 10 such that the flat surface of the upper wedge 105 abuts a wall of the groove 54 and the opposing second surface 108 of the lower wedge 110 lies against the respective building bolt 22. The tensioning bolt 115 of the wedge assembly 100 may be tightened to secure the stator core 10 to the building bolt 22. The tightening may be accomplished by a standard pre-calibrated torque tool. In an embodiment, the amount of torque applied by the pre-calibrated torque tool to the tensioning bolt 115 needed to secure the wedge assembly 100 to the building bolt 22 may be calculated utilizing the known ramp angle θ of the ramped profile and the desired locking force. The method may be part of a retrofit operation when replacing a stator core with a new stator core.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A generator, comprising:
   a stator frame including a bore and a plurality of circumferentially disposed building bolts mounted around and extending within the bore;
   a plurality of stator donuts defining a stator core, each donut including a plurality of circumferentially disposed notches around an outer perimeter of the donut that align with notches in other stator donuts and form slots extending the length of the stator core, each notch including opposing side walls, each side wall including a groove;
   a plurality of wedge assemblies for mounting the stator donuts to the plurality of building bolts, each wedge assembly comprising:
   a set of opposing wedges, the set positioned within a respective notch to create a locking force between a building bolt of the plurality of building bolts and the stator core, and
   each of the opposing wedges comprises a tensioning bolt,
   wherein the tensioning bolt 120 sets the opposing wedges to a position creating a locking force between the stator core and the building bolt,
   wherein the set of opposing wedges comprises:
   an upper wedge including a first surface configured to be positioned to engage with the groove and a first opposing surface including a threaded portion, and
   a lower wedge including a second surface that conforms to the building bolt and a second opposing surface that mates to the first opposing surface.

2. The generator as claimed in claim 1, wherein the first opposing surface of the upper wedge and the second opposing surface of the lower wedge 110 each include a repeating ramped profile that interlock when mated.

3. The generator as claimed in claim 1, wherein the second opposing surface of the lower wedge includes a slot that carries the tensioning bolt, and wherein when a torque is applied to the tensioning bolt 115, the tensioning bolt 115 is threaded into the threaded portion moving the upper wedge and lower wedge against one another creating the locking force.

4. The generator as claimed in claim 3, wherein a ramp angle θ of the ramped profile is used to calculate the amount of torque needed to be applied to the tensioning bolt to create the locking force.

5. The generator as claimed in claim 4, wherein the ramp angle is in a range of greater than 0 to 10 degrees.

6. A method for assembling the stator core of a generator, the method comprising the steps:
   stacking a plurality of stator donuts to define a stator core 10; and
   attaching the stator core 10 to a stator frame of a generator by mounting the plurality of stator donuts to a plurality of building bolts associated with the stator frame utilizing a plurality of wedge assemblies, the mounting comprising:
   sliding each wedge assembly into a respective notch so that a first side of the upper wedge is positioned to abut a wall of the groove and a curved side of the lower wedge lies against the building bolt, and
   tightening the tensioning bolt 115 of each wedge assembly 100 effective to secure the stator core 10 to the building bolt,
   wherein each set of opposing wedges comprises:
   an upper wedge including a first surface 102 configured to be positioned within the groove and a first opposing surface 104 including a threaded portion, and
   a lower wedge including a curved surface 108 that conforms to the building bolt and a second opposing surface that mates to the first opposing surface.

7. The method as claimed in claim 6, wherein the first opposing surface and the second opposing surface 106 each include a repeating ramped profile that interlock when mated.

8. The method as claimed in claim 7, wherein the second opposing surface includes a slot that carries the tensioning bolt, and wherein when tension is applied to the tensioning bolt, the tensioning bolt is threaded into the threaded portion moving the upper wedge and lower wedge against one another creating the locking force.

9. The method as claimed in claim 6, the tightening includes calculating a torque applied to the tensioning bolt 115 using a ramp angle θ of the ramped profile and the locking force.

10. The method as claimed in claim 6, wherein the tightening is performed by pre-calibrated torque tool.

11. A wedge assembly for securing a stator core of a generator to a building bolt during a stator core stacking process, comprising:
   a set of opposing wedges configured to slide into a notch of a stator core 10 and provide a locking force between the building bolt and the stator core, comprising:
      an upper wedge including a first surface and a first opposing surface including a threaded portion, and
      a lower wedge including a curved surface that conforms to the building bolt and a second opposing surface that mates to the first opposing surface,
      wherein the first opposing surface of the upper wedge and the second opposing surface of the lower wedge each include a repeating ramped profile that interlock when mated; and
   a tensioning bolt arranged in the upper wedge and the lower wedge to receive a torque effective to drive the set of opposing wedges in opposite directions making the wedge assembly 100 thicker.

12. The wedge assembly 100 as claimed in claim 11, wherein the second opposing surface of the lower wedge includes a slot that carries the tensioning bolt.

13. The wedge assembly 100 as claimed in claim 11, wherein the ramp angle is in a range of greater than 0 to 10 degrees.

* * * * *